(12) United States Patent
Tora et al.

(10) Patent No.: US 11,347,851 B2
(45) Date of Patent: May 31, 2022

(54) SYSTEM AND METHOD FOR FILE ARTIFACT METADATA COLLECTION AND ANALYSIS

(71) Applicant: Saudi Arabian Oil Company, Dhahran (SA)

(72) Inventors: Aminullah Sayed Tora, Dhahran (SA); Rana AlNujaidi, Dhahran (SA); Sharjeel Anjum, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 380 days.

(21) Appl. No.: 16/284,083

(22) Filed: Feb. 25, 2019

(65) Prior Publication Data

US 2020/0272734 A1 Aug. 27, 2020

(51) Int. Cl.
*G06F 21/56* (2013.01)
*G06N 20/00* (2019.01)

(52) U.S. Cl.
CPC .......... *G06F 21/564* (2013.01); *G06F 21/561* (2013.01); *G06F 21/565* (2013.01); *G06N 20/00* (2019.01)

(58) Field of Classification Search
CPC .... G06F 21/561; G06F 21/564; G06F 21/565; G06F 21/56; G06F 21/57; G06F 2221/033; G06F 2221/034; G06N 20/00; H04L 63/1425; H04L 63/1408; H04L 63/1433; H04L 63/145
See application file for complete search history.

(56) References Cited

U.S. PATENT DOCUMENTS

| | | | |
|---|---|---|---|
| 6,952,776 B1 * | 10/2005 | Chess | G06F 21/564 |
| | | | 707/999.103 |
| 7,801,894 B1 | 9/2010 | Bone et al. | |
| 9,009,820 B1 | 4/2015 | McDougal et al. | |
| 9,021,260 B1 | 4/2015 | Falk et al. | |

(Continued)

OTHER PUBLICATIONS

International Search Report and Written Opinion in Corresponding PCT Application No. PCT/US2020/018110 dated Jun. 9, 2020. 11 pages.

(Continued)

*Primary Examiner* — Robert B Leung
(74) *Attorney, Agent, or Firm* — Leason Ellis LLP (57) ABSTRACT

A non-transitory computer-readable medium comprising instructions which cause a computer system to carry out a method for artifact metadata extraction and analysis. The method includes the steps of collecting an artifact from a source, determining whether the artifact has been previously analyzed; if the artifact has not been previously analyzed, identifying a type of the artifact, recursively extracting embedded artifacts and metadata within the artifact, testing to determine whether the artifact has reached minimal elements, continuing to recursively extract embedded artifacts and metadata if the artifact has not been fully broken down, analyzing all artifacts, embedded artifacts, and metadata, once extraction has been completed, for malicious content; storing the artifacts, embedded artifacts, metadata and analysis results in a central database; and triggering a security action if it is determined, that any of the original artifact, one or more embedded artifacts and metadata extracted from the artifact contain malicious content.

10 Claims, 7 Drawing Sheets

(56) References Cited

U.S. PATENT DOCUMENTS

| | | | |
|---|---|---|---|
| 9,594,904 B1* | 3/2017 | Jain | G06F 21/566 |
| 9,959,407 B1 | 5/2018 | Li et al. | |
| 10,523,609 B1* | 12/2019 | Subramanian | H04L 63/1416 |
| 2005/0149749 A1* | 7/2005 | Van Brabant | G06F 21/564 |
| | | | 726/24 |
| 2010/0088317 A1 | 4/2010 | Bone et al. | |
| 2013/0276114 A1 | 10/2013 | Friedrichs et al. | |
| 2015/0180997 A1* | 6/2015 | Ramanan | H04L 67/2842 |
| | | | 709/214 |
| 2015/0248556 A1* | 9/2015 | Sickendick | G06F 21/563 |
| | | | 726/23 |
| 2015/0269382 A1 | 9/2015 | Hutton et al. | |
| 2017/0068816 A1* | 3/2017 | Cavazos | G06F 21/562 |
| 2017/0171229 A1 | 6/2017 | Arzi et al. | |
| 2017/0251003 A1 | 8/2017 | Rostami-Hesarsorkh et al. | |
| 2017/0318035 A1 | 11/2017 | Baughman et al. | |
| 2017/0357813 A1 | 12/2017 | Petersen et al. | |
| 2018/0113920 A1* | 4/2018 | Klein | G06F 16/1794 |

OTHER PUBLICATIONS

Korkmaz, Yakup. "Automated detection and classification of malware used in targeted attacks via machine learning." (Doctoral dissertation, bilkent university). 2015.

Mohaisen, et al. "Amal: High-fidelity, behavior-based automated malware analysis and classification." computers & security 52 (2015): 251-266.

* cited by examiner

SYSTEM AND METHOD FOR FILE ARTIFACT METADATA COLLECTION AND ANALYSIS

CROSS-REFERENCE TO RELATED APPLICATIONS

This application is related to commonly-assigned and co-pending U.S. patent application Ser. No. 16/272,542 ('542 Application), filed on Feb. 11, 2019 and entitled "System and Method for Forensic Artifact Analysis and Visualization."

FIELD OF THE DISCLOSURE

The present invention relates to information technology (IT) security, and, more particularly, relates to a system and method for forensic artifact analysis.

BACKGROUND OF THE DISCLOSURE

Organizations with significant IT infrastructure receive numerous IT artifacts, including files and byte streams of numerous types, by virtue of their connection with external networks. Among the numerous artifacts received, some, even if only a small percentage, can present cybersecurity threats. To identify potential forensic artifacts, IT personnel monitor incoming data traffic and frequently (e.g., daily) perform lookups and analyze numerous artifacts. The artifacts themselves can be greatly varied and include files, objects, byte streams, as well as meta-data such as IPv4 and IPv6 addresses, domains, uniform resource locators (URL's), email addresses, hashes, and binary-blobs. First-line security mechanisms can be used to quarantine the files and bit streams containing unknown artifacts into a dedicated local repository. Usually, in most environments, thousands of files are quarantined daily and require additional forensic analysis to break down the files and analyze for maliciousness using various techniques.

While current analytical software systems exist that attempt to compare artifacts against known threats, they provide different capabilities and outputs, rendering most analyses based on such system time consuming. Moreover, various types of metadata included in the files is often overlooked (not analyzed). Through lack of sufficient analysis and correlation of the meta-data within these files, security teams can be unaware of on-going events across the IT infrastructure, and opportunities to gather additional intelligence by thorough analysis are wasted.

In short, what is needed is an efficient and comprehensive analysis and correlation of forensic artifacts against known malicious indicators that also breaks down files and bit streams to their smallest units in order to extract embedded files, objects, streams, and meta-data for direct analysis and threat intelligence collection.

It is with respect to these and other considerations that the disclosure made herein is presented.

SUMMARY OF THE DISCLOSURE

Embodiments of the present disclosure provide a non-transitory computer-readable medium comprising instructions which, when executed by a computer system, cause the computer system to carry out a method for artifact metadata extraction and analysis. The method includes the steps of: collecting an artifact from a source; determining whether the artifact has been previously analyzed; if the artifact has not been previously analyzed: identifying a type of the artifact; recursively extracting embedded artifacts and metadata contained in the artifact; testing to determine whether the artifact has been broken down into minimal constituent elements; continuing to recursively extract one or more embedded artifacts and metadata if is determined that the artifact has not been broken down into minimal constituent elements; analyzing all artifacts, embedded artifacts, and metadata, once extraction has been completed, for malicious content; storing the artifacts, embedded artifacts, metadata and analysis results in a central intelligence database; and triggering a security action if it is determined, by the analysis step, that any of the original artifact, one or more embedded artifacts and metadata extracted from the artifact contain malicious content.

In certain embodiments, the non-transitory computer-readable medium further comprises instructions which, when executed by a computer system, cause the computer system to carry out the step of queuing the artifact after it is determined that the artifact has not been previously analyzed.

In further embodiments, the non-transitory computer-readable medium further comprises instructions which, when executed by a computer system, cause the computer system to carry out the step of identifying a type of the embedded artifact directly after the embedded artifact is extracted.

In certain implementations, the artifacts, embedded artifact and meta data are analyzed using a plurality of distinct analysis modules. The analysis modules can include a signature matching module, a heuristic matching module, a machine learning module and a deep learning module.

In certain embodiments, the non-transitory computer-readable medium further comprises instructions which, when executed by a computer system, cause the computer system to carry out the step of after generating a hash of the artifact. In some implementations, the step of determining whether the artifact has been previously analyzed includes looking up the hash in memory storage.

In further embodiments, the step of testing whether the artifact has been broken down into minimal constituent elements includes comparing results of an extraction step with results of a previous extraction step, a comparison match indicating that the artifact has been fully broken down.

Embodiments of the present disclosure also provide a system for metadata extraction and analysis. The system comprises a collection node having a processor configured to execute program code and has the following modules: a collector module configured to collect artifacts from a source; and a cache module configured to determine whether the artifact has been previously processed; a central node having a processor configured to execute program code with the following modules: an identifier module configured to identify the type of artifact; a recursive extractor module configured to: recursively extract one or more embedded artifacts and metadata contained in the artifact; determine whether the artifact has been broken down into minimal constituent elements; and continuing to recursively extract embedded artifacts and metadata if is determined that the artifact has not been broken down into minimal constituent elements; and an analysis module configured to analyze all artifacts, embedded artifacts, and metadata, once extraction has been completed for malicious content and to trigger a security action if it is determined that any of the original artifact, embedded artifacts and metadata extracted from the artifact contain malicious content. The artifacts, one or more embedded artifacts, metadata and analysis results are stored in a central intelligence database.

In certain embodiments, at least one of the collector node and the central node include a queue module configured to hold the artifact in a queue after it is determined that the artifact has not been previously analyzed.

In certain embodiments, embedded artifacts are routed to the identifier module after being extracted by the recursive extractor module.

In some implementations, the analysis module includes a plurality of sub-modules, each of which analyzes the artifacts, embedded artifacts and meta data using a distinct technique. The analysis sub-modules can include a signature matching module, a heuristic matching module, a machine learning module and a deep learning module that generate an alert when the resulting analysis deems maliciousness.

In further embodiments, wherein the recursive extractor module determines whether the artifact has been broken down into minimal constituent elements by comparing results of an extraction step with results of a previous extraction step, a comparison match indicating that the artifact has been fully broken down.

In some implementations, the cache module is configured to generate a hash of the artifact received from the collector module. The step of determining whether the artifact has been previously analyzed can include looking up the hash in memory storage.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLSOURE

The systems and methods disclosed herein employ computing resources executing one or more program modules to perform a series of steps on forensic artifacts received (ingested) in an IT environment. A computing system executing one or more applications on one or more processors queues, loads, and analyzes and correlates the artifacts using an external analysis solution ("external analyzer") that can be called through an application user interface (API). The data output of the external analyzer can be used to search an external central intelligence database for further analysis. The artifact is then classified using a second analyzer module that applies a series of rigorous analysis methods to the artifacts, including generating an alert. The resulting data set is then arranged by a visualizer for feedback to an autonomic system through an application programming interface (API) or to a human analyst through a graphic user-interface.

Embodiments of the present invention disclosure also provide an external analyzer that recursively extracts embedded files, objects, streams, and metadata for analysis and correlation. The external analyzer comprises of a collector node and a central node. The collector node collects file artifacts and associated metadata from associated file shares or repositories and transfers the collected artifacts to the central node. At the central node, the artifacts are processed in an analysis node that reviews the collected data for initial identification of the artifacts and recursively extracts further artifacts and metadata from the collected artifacts. The analysis node further utilizes algorithmic techniques such as signature matching, heuristic rule-based analysis, machine learning and deep learning algorithms to analyze the data and artifacts for maliciousness, and subsequently an alert is triggered and stored as part of the data set that is subsequently propagated through the modules up to the application programming interface (API) module. The artifacts, meta-data, and analysis results are stored in a central intelligence database for further correlation and cyber intelligence analysis.

At the outset it is noted that the term "module" used in the description and accompanying figures is defined as program code and associated memory resources, that when read and executed by a computer processor, perform certain defined procedures. For example, an "analyzer module" comprises program code that when executed by a computer processor, performs procedures related to analysis of file data, bitstream data and/or metadata.

Figure 1:
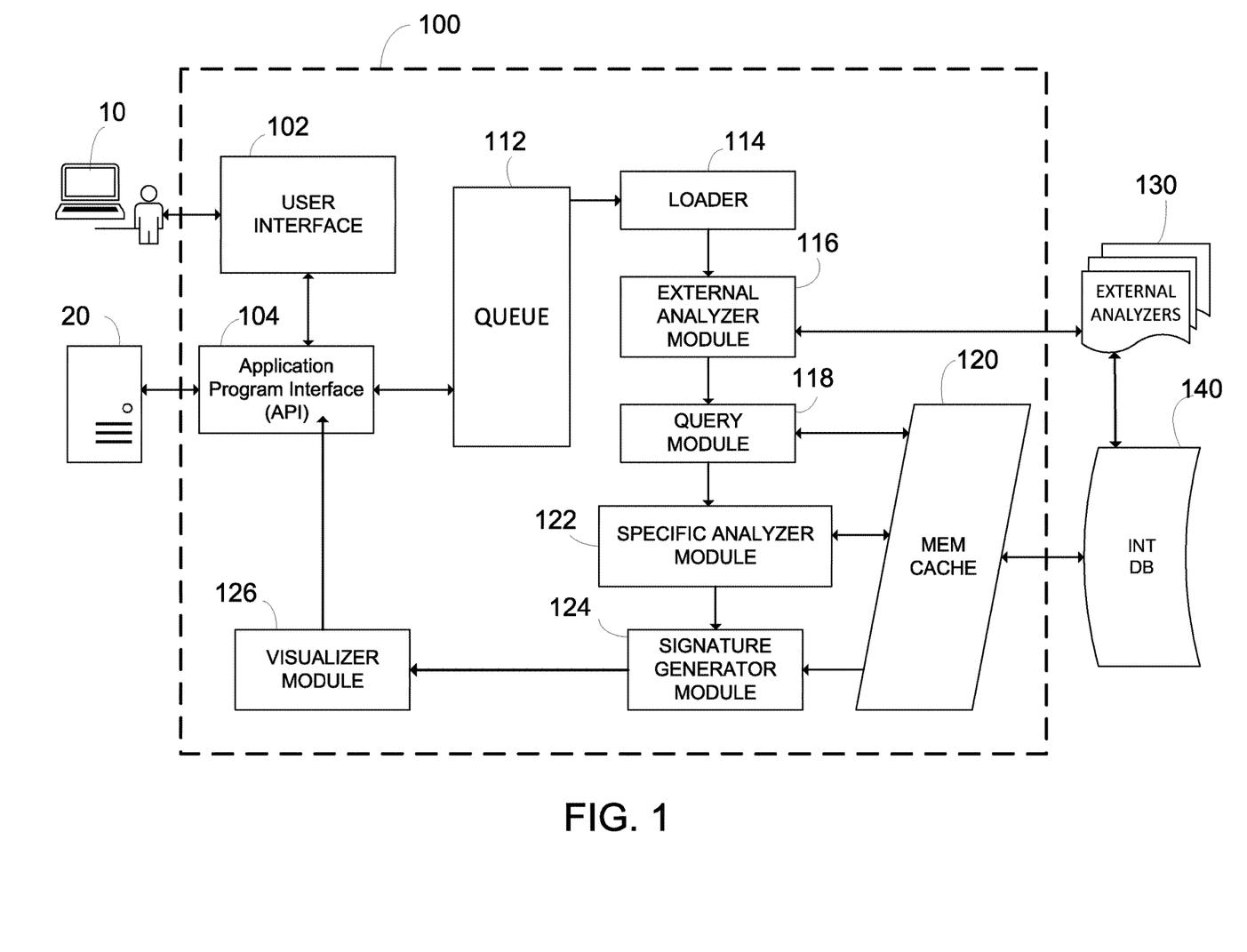
FIG. 1 is a schematic block diagram of a system for forensic artifact analysis according to an exemplary embodiment of the present invention.

Referring to FIG. 1, a schematic block diagram of an exemplary embodiment of a system for forensic artifact analysis according to the present invention is shown. System 100 comprises one or more computing devices having processors configured to execute a group of related program modules. Forensic analysis system 100 is in communication with end users, including human end users 10 and external computer systems 20 that provide data to and receive analysis output from the forensic analysis system. The human end users 10 can interact with the system 100 via a user interface 102 and can submit artifacts to the system 100 for forensic analysis, including, but not limited to files, bitstreams, URLs, IP addresses, email messages, domains, and MAC Addresses. The submissions entered through the user interface 102 are passed to an application program interface (API) module 104. Similarly, non-human (computing/network device) end users, for example, external applications or platforms, can submit artifacts and analysis requests directly to the API module 104. The API module 104 includes program code that when executed manages traffic between the end users and the rest of the forensic analysis system. The API module 104 enters the submitted artifacts into a queue module 112. The queue module 112 temporarily stores submitted artifacts to provide an ordered flow of artifact analysis procedures. For instance, if numerous artifact analysis requests are received within a short span of time, the queue module 112 can provide for a first-in first-out (FIFO), last-in-first out (LIFO), or other known method for both ensuring that the system does not get overloaded, and that every submission is processed.

Submissions are delivered from the queue module 112 in an orderly flow to a loader module 114. The loader module 114 comprises code for enabling a processor to review the artifact and to identify it as belonging to a general artifact type. By classifying the artifacts by type, the loader 114 allows the artifacts to be sorted and delivered to analyzer modules adapted for the specific artifact types. The loader 114 is coupled to an external analyzer module 116 which can be implemented as an application program interface that is communicatively coupled to a plurality of external analyzers 130. The external analyzer module 116 is operative to select one or more appropriate external analyzers for each artifact ingested from the loader 114 and to open a communication channel with the selected external analyzers. Program logic is employed to determine which external analyzer is appropriate for a given artifact being processed (e.g., ingested from the loader). The external analyzers 130 include dynamic analyzers adapted to analyze file artifacts. The dynamic analyzers can be used to gather additional forensic artifacts as a result of dynamic analysis of the file such as registry contents, transient files, memory contents consisting of data and executable operation codes, network communications packet captures, referenced runtime API's, and all related metadata. The external analyzers also include applications adapted to process less complex artifacts such as IP addresses, domains, URL's, MAC addresses, strings, etc. to find relevant data and metadata. The output generated by the external analyzers is communicated to a shared central intelligence database 140. The central intelligence database 140 is a secure database that is hosted externally to system 100 and receives the contributions of numerous systems for intelligence gathering and storage. The central intelligence database 140 can operate, for example, as a SQL server and can provide data in response to queries.

The external analyzer module 116 directs the results from the external analyzers 130 to a query module 118. The query module 118 is configured to parse the results received from the external analyzer module 116 to obtain relevant fields for constructing a query to the central intelligence database 140. The relevant fields of the query can include the original artifact, additional relevant forensic artifacts discovered by dynamic analysis, and associated metadata. The query module 118 then executes the query against the central intelligence database. At the central database, execution of the query triggers a search for matching artifacts and associated data in the database. If there are no matches, all of the information provided in the query is stored in the central intelligence database 140. If matches exist, the matched artifacts and associated data (the "query set") is communicated back to the query module 118. In addition, the central intelligence database stores the result query set. A reference to the stored location of the query set is provided to an in-memory cache 120 which comprises memory storage capacity, such as chip cache memory, within system 100, enabling rapid access and retrieval of the query set data.

Figure 2:
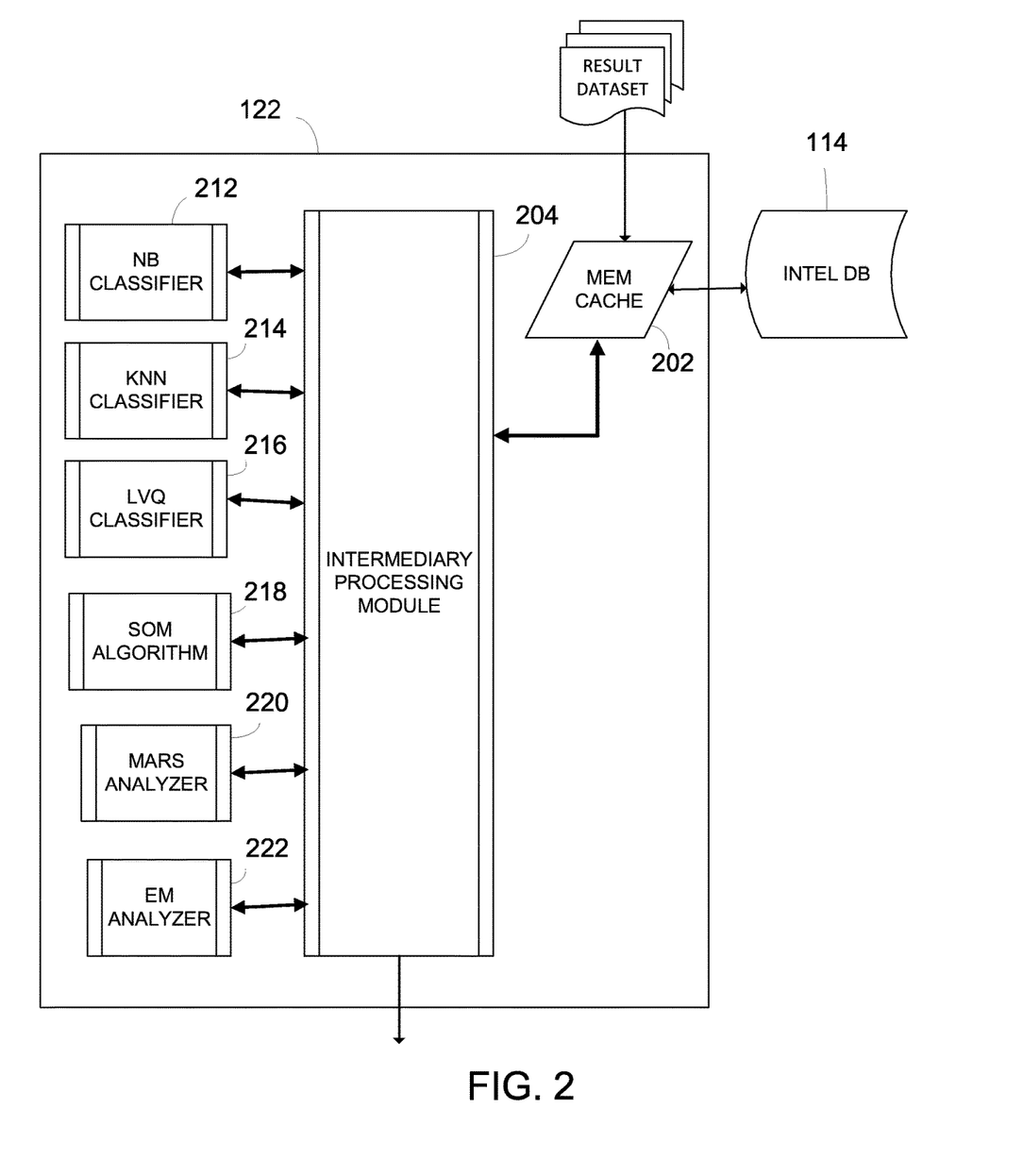
FIG. 2 is a schematic illustration of an exemplary embodiment of a specific analyzer module used in the system for forensic artifact analysis according to the present invention.

The query module provides the output from the external analyzers 130 and any query set results ("result dataset") received from the central intelligence database 140 to a specific analyzer module 122. An exemplary embodiment of a specific analyzer module according to the present invention is shown in FIG. 2. The result dataset is delivered to a local memory cache 202 of the specific analyzer module in which the result dataset is stored. The specific analyzer module 122 includes a plurality of sub-modules configured to perform a specific type of analysis on the dataset. The sub-modules include a Naïve Bayes classifier 212, a K-Nearest Neighbor KNN classifier 214, an Learning Vector Quantization (LVQ) classifier 216, an Self-Organized Map (SOM) algorithm 218, a Multivariate Adapted Regression Splines (MARS) analyzer 220, and Expectation-Maximization (EM) algorithm 222. The result datasets are sent from the memory cache 202 to an intermediary processing module 204. The intermediary processing module 204 passes the results dataset to the submodules 212-222 in series or in parallel depending on its configuration. In addition, in a preprocessing step, the result dataset can be normalized by the intermediary processing module 204 prior to classification and analysis in sub-modules 212-222.

Sub-modules 212-222 use different techniques to classify the artifact in a received dataset based upon other known artifacts. For example, the NB classifier 212 applies Bayes' Theorem to classify artifacts; KNN classifier 214 employs a non-parametric approach for classification; the LVQ classifier employs a prototype-based approach; the SOM algorithm 218 employs a dimensionality-reduction technique; the MARS analyzer, like the KNN classifier, uses a non-parametric technique; and the EM algorithm employs a non-linear dimensionality-reduction technique. In some implementations, sub-modules 212-222 classify the artifact in a binary category as being either "suspicious" or "not suspicious" based on their analyses of the result dataset. The intermediary processing module 215 also performs data lookups to the central intelligence database 140, as well as stores and updates data in a local memory cache 218. For example, during series processing the classification results of the NB classifier 202 can be delivered to the intermediary processing module 215, which then can store the results in memory cache 218 prior to the next analysis by the KNN classifier 204.

The techniques employed by such sub-modules, which are well-known in the art and not described further herein, are complementary to the extent that they use different approaches, and to the extent they yield similar results, provide a high degree of confidence of accuracy. The specific analyzer module 122 can be implemented in a cluster form for faster performance and can utilize specialized processors such as graphics processing units (GPUs) or field programmable gate arrays (FPGAs).

Figure 3:
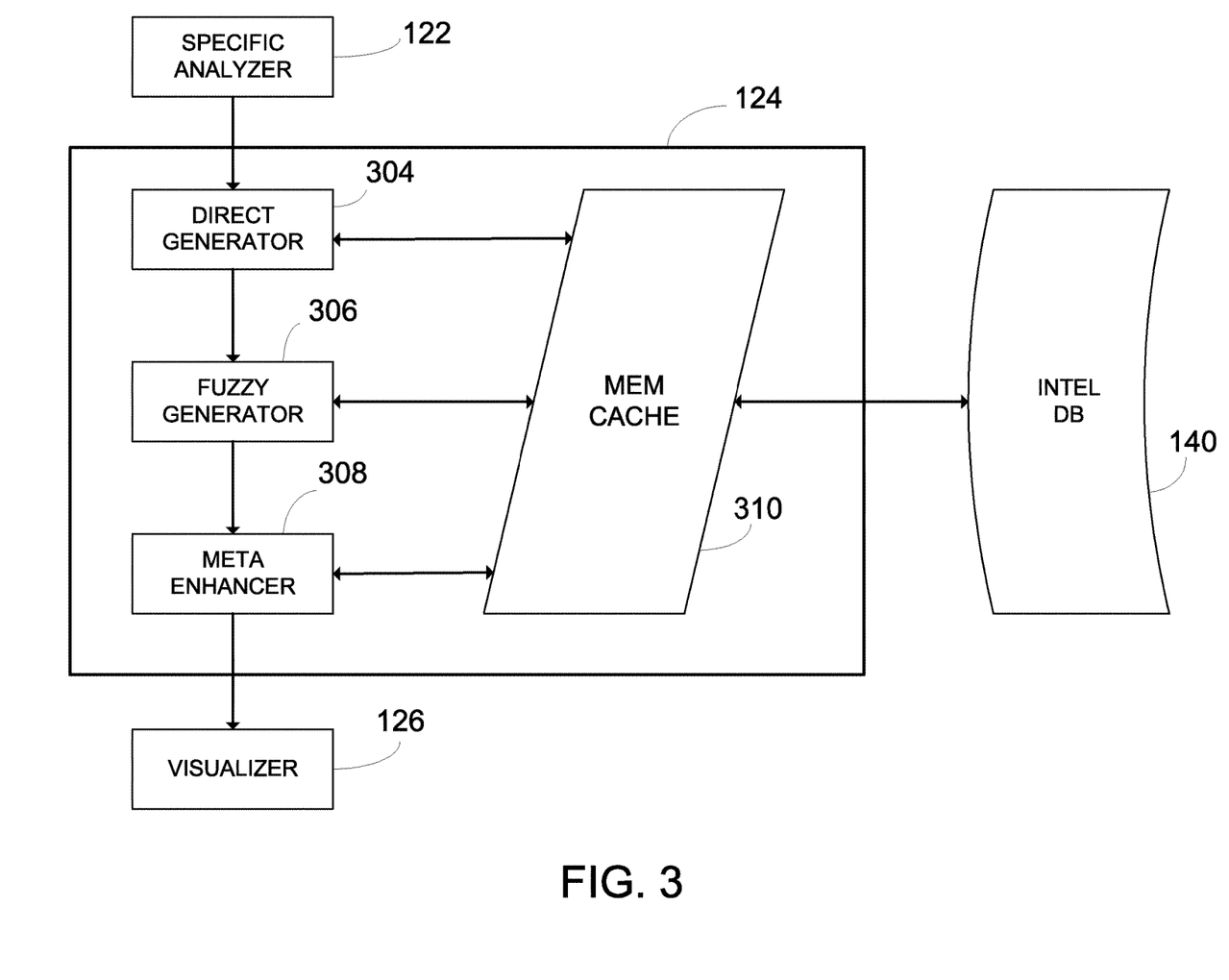
FIG. 3 is a schematic block diagram of an exemplary embodiment of a signature generator module used in the system for forensic artifact analysis according to the present invention.

The output of submodules 212-222, including any matched relationships and alert triggers, is combined and processed by the intermediary processing module 204 and then delivered to one or more signature generation modules 124. A block diagram of an exemplary embodiment of a signature generator module 124 according to the present invention is shown in FIG. 3. Signature generator module 124 includes three sub-modules that create "signatures" of the received outputs. The sub-modules can include a direct generator module 304, a Fuzzy generator module 306 and a Meta Enhancer module 308.

The direct signature generator sub-module 304 creates signatures directly from bytestream content, such as header text. The signatures enable rapid identification of the artifact or resulting component(s) of the artifact during on-going and subsequent analyses in which the artifacts having signatures are matched against other artifacts that are newly observed during daily cybersecurity operational processes. For example, a direct signature can be a hexadecimal bytestream value such as 6a 75 67 67 65 72 6e 61 75 74, which when converted to ASCII code is "juggernaut." The hexadecimal value can be stored as a direct bytestream signature of the artifact or portions thereof for subsequent use in direct matching. The Fuzzy generator sub-module 306 uses a one-way function to create a rolling hash, referred to as a "context-triggered piecewise hash," of the artifact or a component thereof which can be used as a signature. Creating these types of hashes across the component as a whole and its derived subcomponents allows for proximity and nearness relational matches (i.e., matches that compares the total content of an artifact or subcomponent) that are very useful for intelligence purposes in identifying adversaries, tactics, threats, and their tools. Utilizing this approach on the component as a whole and derived subcomponents allows for correlation of intelligence data that may otherwise be overlooked. The Meta Enhancer sub-module 308 uses metadata extracted from the original artifact and tags the artifact, and in some implementations hashes of the artifact, with the metadata, which is used as an identifier. Metadata tags also facilitate correlation against existing and newly found other artifacts for intelligence purposes.

The analysis output and associated signatures are transmitted to a local memory cache 310. The memory cache then synchronously or asynchronously transmits the analysis output and signatures to the central intelligence database 140 for long-term storage.

Additionally, signature generator module 124 sends the analysis output and associated signatures to a visualizer module 126. Visualizer module 126 includes code which configures a processor to convert the received data into a format that is adapted for graphic representation. The converted output of the visualizer module 126 is provided to the API module 104 where it is forwarded to the requesting automated external computer systems 20 and/or end users 10 (via user interface module 102 for presentation to a human end user 10). In user interface module 102, the converted data is represented graphically and syntactically to the human end user 10. Here, the human end user 10 can review and confirm any malicious alerts, newly created signatures, digests, and meta-tags and confirm insertion and reanalysis of associated and related existing data in the central intelligence database 140. This results in a recursive query and analysis using the process disclosed, using the signatures instead of the artifact data. Additionally, external computing systems 20 can utilize the data set and the alert triggers for triggering security procedures. External computing systems can automate cyber response actions through centralized Security Information and Event Management (SIEM) and Security Orchestration Automation and Response (SOAR) solutions for incident tracking, event synthesis, historical searching to detect past events, automating mitigations across network and endpoint solutions, build context in intelligence data to better identify threat actors and their threats, tactic, and procedures (TTPs), map data sets against attack frameworks (e.g. Mitre ATT&CK Framework), and triggering threat hunting across the enterprise. The results can be added to the dataset in the central intelligence database 140. This recursive process can continue as needed to finalize various analysis and investigations.

Figure 4:
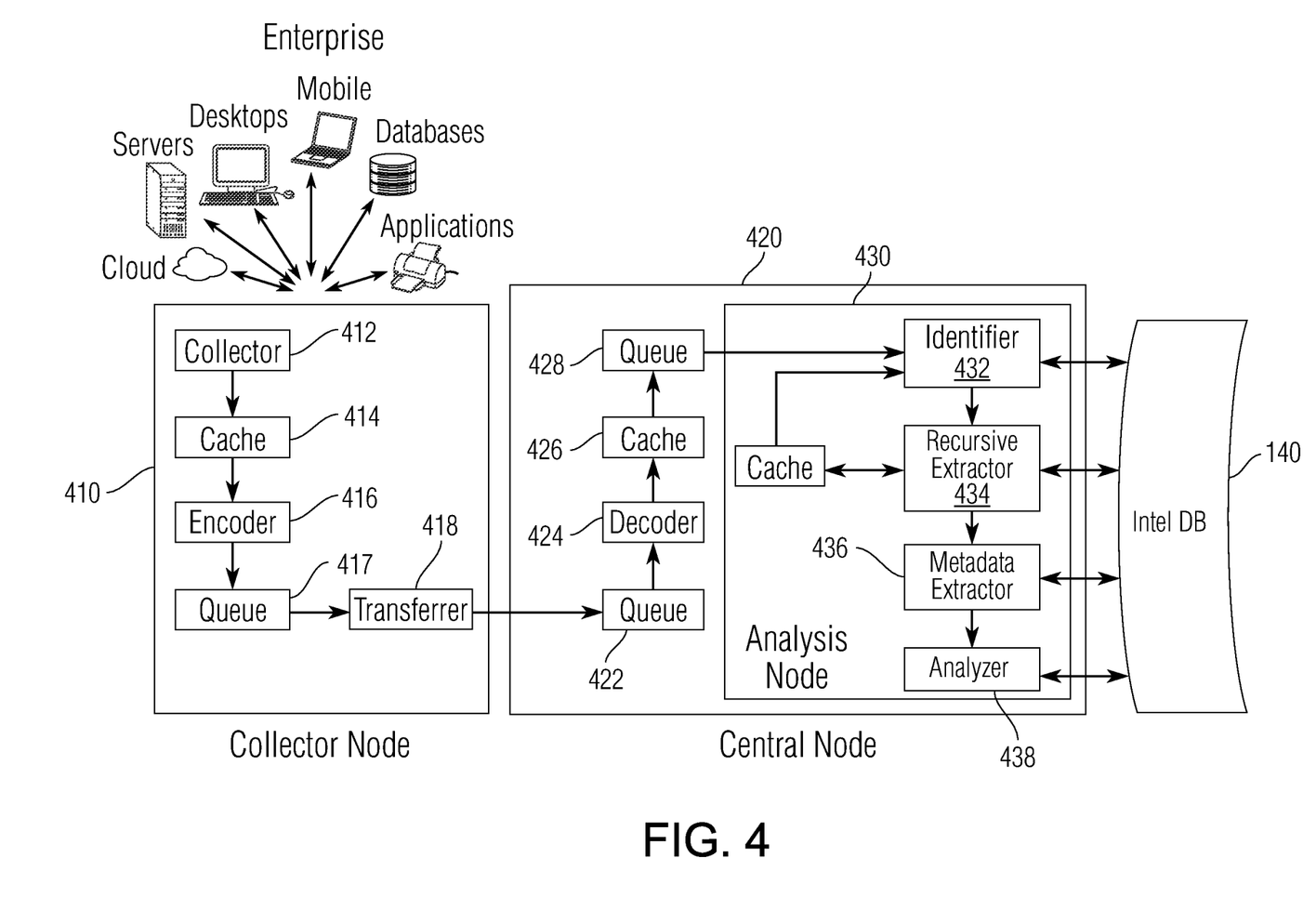
FIG. 4 is a schematic block diagram of another embodiment of a system for forensic artifact analysis according to the present invention that is particularly adapted for file artifact metadata collection and analysis.

FIG. 4 is a schematic block diagram of another embodiment of a system for forensic artifact analysis according to the present invention that is particularly adapted for file artifact metadata collection and analysis. The system 400 comprises a collector node 410 and a central node 420. The collector node 410 and central node 420 can each comprise one or more computing devices such as application servers or, in some implementations, can be co-located in a single computing device as separate applications. The collector node 410 includes a collector module 412 that is configured to retrieve artifacts (e.g., file artifacts) from a plurality of computing resources in which files are stored or linked. In some implementations, the collector module 412 can be configured to retrieve files from a specific source location such as a file share associated with cloud-based services, servers, desktops, mobile systems and devices, databases, and specific applications that store files. The collection module 412 can be configured to collect files of specific types, based on a rule base configuration that identifies the systems or devices to collect from, the file types, file names, file extensions, and related criteria based on file creation, file modification timestamps, permissions, or file sizes.

The collection node also includes a cache module 414 having local memory resources to which the collector node passes retrieved files. The cache module 414 is configured to execute a hash function, such as MD5, SHA1, SHA2, etc., to uniquely identify each file received from the collector module 412. Once a file hash is computed, the cache module 414 performs a lookup of the hash in the cache memory to see if the file has been analyzed before. If the hash is found in the lookup procedure, then a response is provided, allowing the cache module to discard the currently queued file. Otherwise, the file hash is stored and the file is passed to an encoder module 416 for encoding. The operations of the cache module 414 prevents duplication of efforts by avoiding analyzing the same file more than once.

Figure 5:
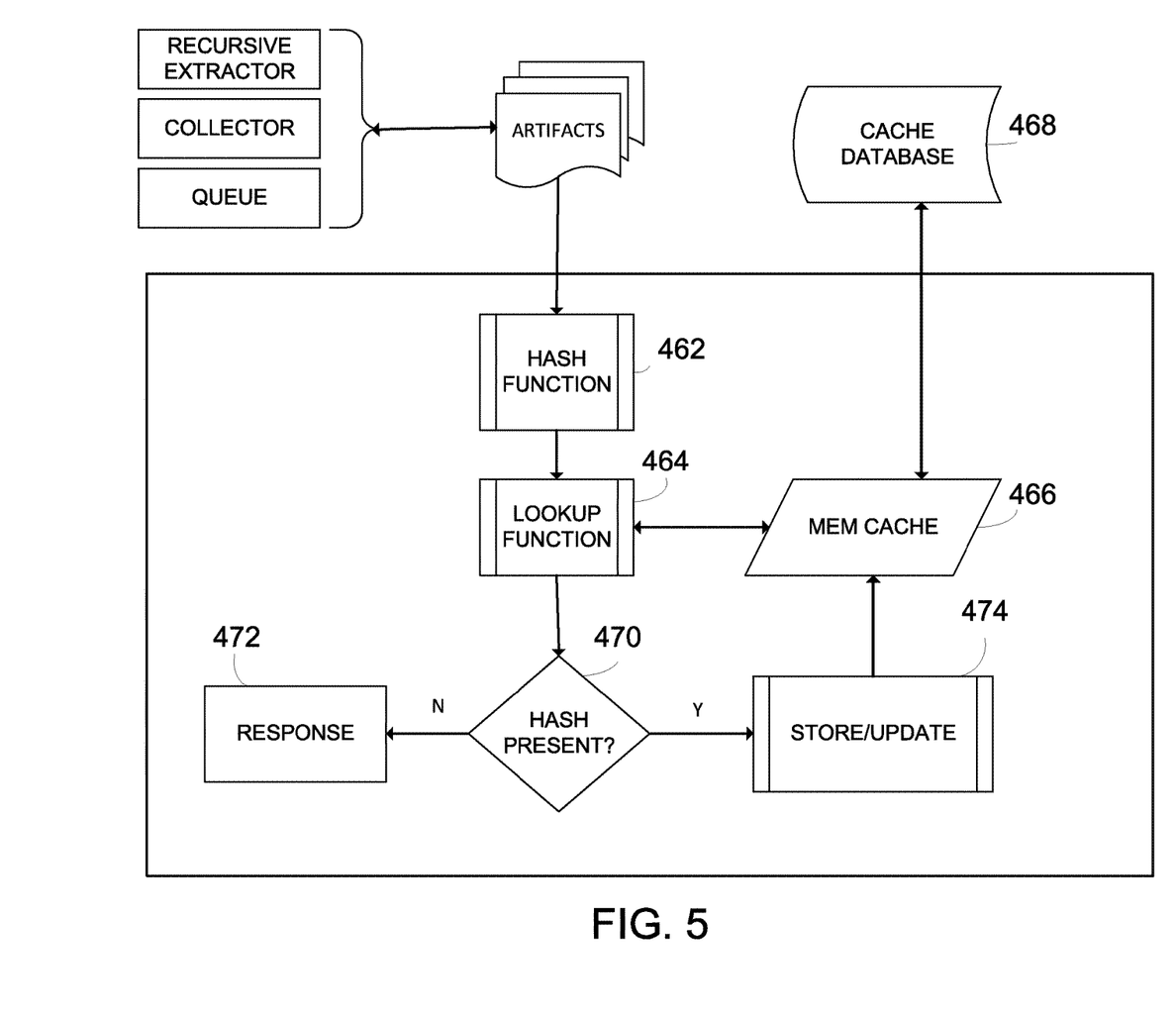
FIG. 5 is a schematic flow diagram of an exemplary embodiment of the flow of functions performed by the cache module according to the present invention.

FIG. 5 is a schematic flow diagram of an exemplary embodiment of the flow of functions performed by the cache module 414 according to the present invention that can be used in the forensic analysis systems disclosed herein. As shown, artifacts received are input to a hash function 462, which, as noted, can be a standard hash function well-known in the art such as MD5, SHA1, SHA2. The hash is passed to a lookup function 464 which accesses memory cache 466 to determine if the hash has been generated previously. In some implementations, the memory cache can periodically load data to a cache database 468, which, in turn, can upload data to the central intelligence database 140. If it is determined (flow element 470), from the results of the lookup function that the hash is already present, a response procedure 472 automatically generates a notification which is passed to the end users 10, 20. The notification can include text or other codes to inform the end users the ingested artifact has already been analyzed by the forensic system 400. If it is determined that the hash is new, the hash is stored 474 and the memory cache 466 is updated with an entry of the new hash.

Returning to FIG. 5, the encoding module 416 is configured to perform an encoding operation, such as simple byte level XOR based encoding with a key or utilizes any symmetric encryption algorithm with a key to encode the original file. The encoding allows the file to be transferred and stored without triggering alerts or active responses by system or network-based security apparatus or modules that detect out-of-policy files, malicious files, or patterns. After the encoding procedure, the encoder module 416 passes the encoded file artifact to a queue module 417. The queue module 417 works in tandem with a transfer module 418. The queue module 417 temporarily stores the file artifact in a queue until the transferrer module 418 de-queues the file artifact and transfers it to a queue module 422 residing on the central node 420. The timing of the queuing and de-queuing is determined by the workflow pipeline. For example, when the queue module 422 of the central node 420 signals to the transfer module 418 of the collector node that it is ready to accept a new file artifact for processing, the transfer module 418 is prompted to upload the file artifact to the queue module.

The file artifact is de-queued at the queue module 422 and then passed to a decoder module 424 for decoding. The decoder module 424 can decode the module using standard byte stream based XOR, with a symmetric or asymmetric key. Once the file artifact is decoded it is passed to cache module 426. Cache module 426 analyzes the file for duplicates by lookup in a similar manner as the cache node 414 of the collection node. If the file artifact has not been analyzed, it is passed to an additional queue module 428. The file artifact is temporarily stored by queue module 428 until it is de-queued by the identifier module 432 of an analysis node 430 which is a component of the central node 420.

The analysis node can be implemented using one or more separate computing devices coupled to the other parts of the central node 420 as shown, or may be implemented in the same computing device. The identifier module 432 is configured to parse the file artifact into a byte-stream and identifies it as a specific type of file with a specific format. Additionally, the identifier module 432 is configured to interrogate the file internally utilizing various methods such as byte-stream based "magic header" matching via tables of known file signatures, format indicators, machine and human linguistic syntax analysis to further analyze the file for various characteristics such as for strings (ASCII, Unicode, etc.) and embedded artifacts. These techniques are used to further identify embedded files, objects, streams, human and machine language, general executable byte-code patterns, and random or encrypted byte patterns that can be present in a file artifact. Identifications are stored in the central intelligence database 140.

As the embedded artifacts are identified, the artifact is passed to a recursive extractor 434 that extracts these the embedded items from the artifact recursively. The recursive extractor 434 continues to break down the artifact into parts until all embedded portions have been extracted and no further meaningful data can be obtained from the original artifact (i.e., the artifact has been broken down into its minimal constituent elements). One way this can be determined is when an extraction step yields the same artifacts and data as a previous extraction step, indicating that no further data can be yielded from the artifact. As the items are extracted, they are passed through to a cache module which performs lookups to determine if the embedded artifacts have been previously analyzed. If the lookup finds no match, the embedded artifacts are delivered back to the identifier module 432 to continue the same analysis process. Results are stored or updated in the central intelligence database 140. Once each artifact (file, object, stream, byte-code patterns) is uniquely identified and reduced down to a non-reducible level, it is passed to a metadata extractor 436 to further extract any additional metadata such as string patterns, byte-code patterns, magic identifiers, author, creation timestamps, modification timestamps, programming language syntax identification, human language identification, URL's, emails, domains, IP addresses, MAC addresses, Geo-Location identifiers, phone numbers, physical addresses, etc. Once all metadata has been extracted and stored in the central intelligence database 140, the artifact is passed to an analyzer module 438 for further analysis.

Figure 6:
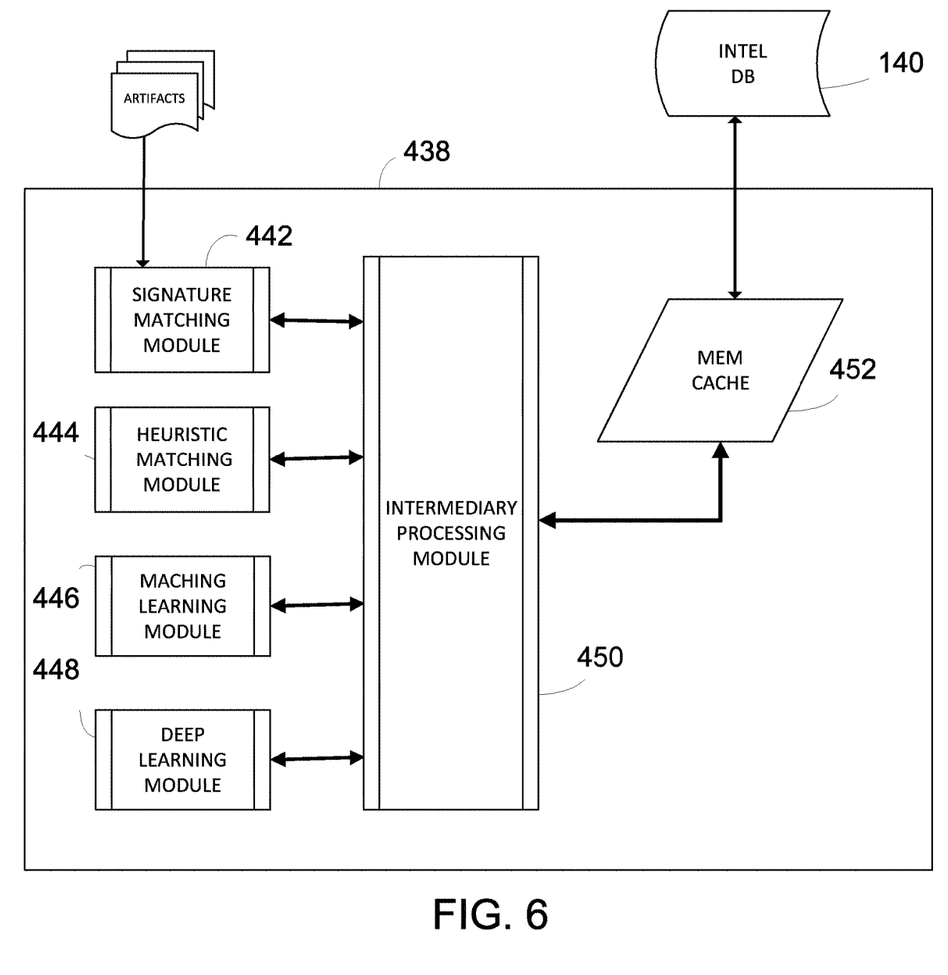
FIG. 6 is a schematic block diagram of an exemplary embodiment of an analyzer module adapted for the embodiment of the analysis system shown in FIG. 4.

FIG. 6 is a schematic block diagram of an exemplary embodiment of an analyzer module 438 adapted for the embodiment of the analysis system shown in FIG. 4. The analyzer module 438 includes a plurality of analysis modules that can be used in series or in parallel to analyze artifacts and metadata. A signature matching module 442 is configured to statically identify the file as malicious using known malicious signatures. A heuristic matching module 444 is configured to perform heuristic analysis of the file based on rule-sets to identify it as malicious itself or an artifact known to be used by a known malicious entity. A machine learning module 446 is configured to execute one or more machine learning algorithms to classify and/or analyze the artifact. A deep learning module 448 is configured to execute one or more deep learning algorithms, such as neural networks, to further gain an understanding of the artifact and its relationship to closely related and other related and unrelated artifacts. All findings and results of the analysis modules 442-448 are passed to an intermediary processing module 450 and then to an in-memory cache 452 which is used for rapid memory access on an as-needed basis for lookup requests sent by the analysis modules (via the intermediary processing module 450). The data in the cache 452 is transmitted for storage in the central intelligence database 140 at set intervals.

Figure 7:
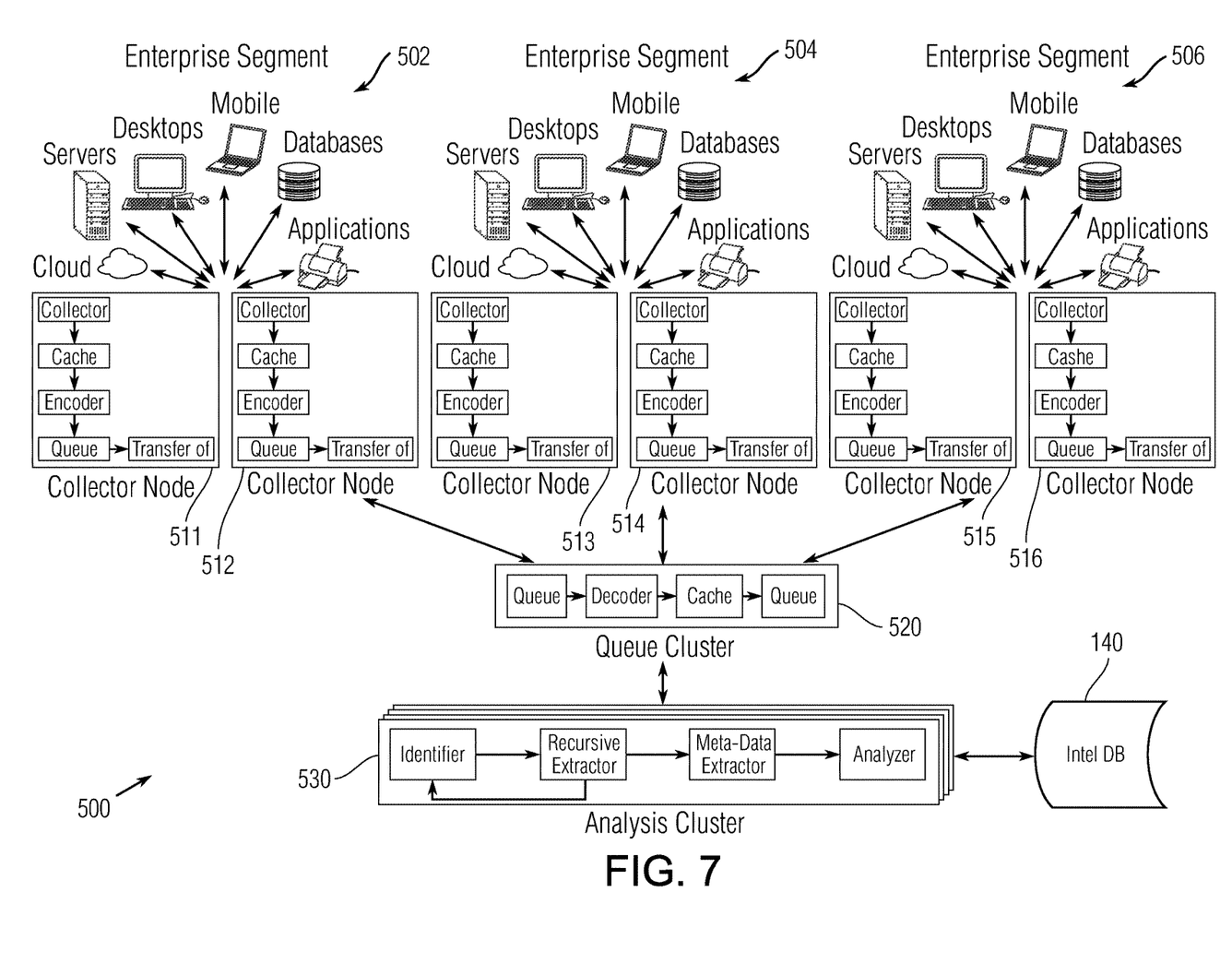
FIG. 7 is a schematic block diagram of another embodiment of a system for forensic artifact analysis according to an exemplary embodiment of the invention.

FIG. 7 depicts another embodiment of a system for forensic artifact analysis that employs a plurality of collector nodes and clusters of queue and analysis nodes to provide load balanced and simultaneous analysis for a large enterprise. The system 500 includes three enterprise segments 502, 504, 506, each comprises a plurality of computing resources. Segment 502 supplies artifacts to collector nodes 511 and 512. Segment 504 supplies artifacts to collector nodes 513 and 514, while segment 506 supplies artifacts to collector nodes 515 and 516. The collector nodes 511-516 can be similar to those described above. Collector nodes 511-516 send the collected file artifacts to a central queue cluster 520. The queue cluster can include a plurality of queue, decoder and cache modules that can each operate similarly to the modules 422-428 described above with respect to FIG. 4. The cluster of modules of the queue cluster 520 operate in parallel to process large request loads. The queue cluster queues requests for an analysis cluster 530 that includes a plurality of analysis nodes similar to the analysis node 430 described above. The plurality of analysis nodes in the analysis cluster 530 also operate in parallel provide load balanced, simultaneous analysis of file artifacts to handle higher volumes of file artifacts. The analysis cluster 530 delivers analysis output to the central intelligence database 140.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer-readable medium comprising instructions which, when executed by a computer system, cause the computer system to carry out a method for artifact metadata extraction and analysis including steps of:
   collecting an artifact from a source;
   determining whether the artifact has been previously analyzed;
   if the artifact has not been previously analyzed:
      identifying a type of the artifact;
      extracting an embedded constituent element from the artifact;
      after the constituent element has been extracted, extracting metadata contained in the artifact and the embedded constituent element;
      testing to determine whether the artifact has been broken down into minimal constituent elements;
      continuing to recursively extract one or more constituent elements, embedded further constituent elements, and metadata if is determined that the artifact has not been broken down into minimal constituent elements;
   analyzing all artifacts, embedded constituent elements, and metadata, once extraction has been completed, for malicious content;
   storing the artifacts, embedded constituent elements, metadata and analysis results in a central intelligence database; and
   triggering a security action if it is determined, by the analyzing step, that any of the artifact, the one or more embedded constituent elements, and the metadata contain malicious content.

2. The non-transitory computer-readable medium of claim 1, further comprising instructions which, when executed by a computer system, cause the computer system to carry out the step of queuing the artifact after it is determined that the artifact has not been previously analyzed.

3. The non-transitory computer-readable medium of claim 1, further comprising instructions which, when executed by a computer system, cause the computer system to carry out the step of identifying a type of the embedded constituent element directly after the embedded constituent element is extracted.

4. The non-transitory computer-readable medium of claim 1, wherein the artifacts, embedded constituent elements and metadata are analyzed using a plurality of distinct analysis modules.

5. The non-transitory computer-readable medium of claim 4, wherein the analysis modules include a signature matching module, a heuristic matching module, a machine learning module and a deep learning module.

6. The non-transitory computer-readable medium of claim 1, further comprising instructions which, when executed by a computer system, cause the computer system to carry out the step of generating a hash of the artifact.

7. The non-transitory computer-readable medium of claim 6, wherein the step of determining whether the artifact has been previously analyzed includes looking up the hash in memory storage.

8. The non-transitory computer-readable medium of claim 1, wherein the artifact is a file.

9. The non-transitory computer-readable medium of claim 1, wherein the artifact is a byte-stream.

10. The non-transitory computer-readable medium of claim 1, wherein the step of testing whether the artifact has been broken down into minimal constituent elements includes comparing results of an extraction step with results of a previous extraction step, a comparison match indicating that the artifact has been fully broken down.

* * * * *